US011425008B2

(12) United States Patent
Krishna et al.

(10) Patent No.: US 11,425,008 B2
(45) Date of Patent: Aug. 23, 2022

(54) VIRTUAL PRIVATE NETWORK MANAGER

(71) Applicant: CERNER INNOVATION, INC., Kansas City, KS (US)

(72) Inventors: Akkaladevi Vijay Krishna, Bangalore (IN); Ravishankar Nagesh, Bangalore (IN); Nese Manjunatha, Bangalore (IN); Pravat Santra, Bangalore (IN); Chirag Bharatia, Bangalore (IN); Neeraj Kumar, Bangalore (IN); Vedagiri Mohan Naveen, Bangalore (IN)

(73) Assignee: CERNER INNOVATION, INC., North Kansas City, MO (US)

( * ) Notice: Subject to any disclaimer, the term of this patent is extended or adjusted under 35 U.S.C. 154(b) by 0 days.

(21) Appl. No.: 16/239,210

(22) Filed: Jan. 3, 2019

(65) Prior Publication Data

US 2020/0220795 A1    Jul. 9, 2020

(51) Int. Cl.
| | | |
|---|---|---|
| *G06F 15/173* | (2006.01) | |
| *H04L 43/062* | (2022.01) | |
| *H04L 43/045* | (2022.01) | |
| *H04L 67/50* | (2022.01) | |
| *H04L 12/46* | (2006.01) | |
| *H04L 9/40* | (2022.01) | |

(52) U.S. Cl.
CPC ........ *H04L 43/062* (2013.01); *H04L 12/4641* (2013.01); *H04L 43/045* (2013.01); *H04L 67/22* (2013.01); *H04L 63/0272* (2013.01)

(58) Field of Classification Search
CPC ......... H04L 63/20; H04L 67/40; H04L 63/08; H04L 43/062; H04L 43/065; H04L 43/045; H04L 67/22; H04L 63/0272; G06Q 10/10
See application file for complete search history.

(56) References Cited

U.S. PATENT DOCUMENTS

| | | | |
|---|---|---|---|
| 10,038,672 B1* | 7/2018 | Raviv | H04L 63/0272 |
| 2014/0136089 A1* | 5/2014 | Hranac | G08G 1/096775 701/118 |
| 2014/0189132 A1* | 7/2014 | Suganthi | H04L 63/0272 709/226 |
| 2016/0050224 A1* | 2/2016 | Ricafort | H04L 61/2007 726/23 |
| 2016/0253078 A1* | 9/2016 | Ebtekar | G06T 11/60 715/735 |
| 2016/0380843 A1* | 12/2016 | Duncan | G06F 3/04842 715/736 |
| 2018/0287920 A1* | 10/2018 | Sanganabhatla | H04L 43/0876 |
| 2019/0020667 A1* | 1/2019 | Parker | H04L 63/145 |
| 2019/0073406 A1* | 3/2019 | Xu | E21B 43/086 |

* cited by examiner

*Primary Examiner* — Ryan J Jakovac
(74) *Attorney, Agent, or Firm* — Shook, Hardy & Bacon L.L.P.

(57) ABSTRACT

Methods, computer systems, and computer-storage medium are provided for monitoring, analyzing, and providing reports regarding direct access technologies, for example DirectAccess, VPN, or VPN-like technologies. User activity associated with DirectAccess servers can be filtered by server location to allow administrators to determine which users, and how many users, utilized or are utilizing each DirectAccess server, which can be identified by geographic locations. In some cases, this information can be used to address technical support issues or to determine which resources of an entity may be under- or over-utilized.

11 Claims, 9 Drawing Sheets

FIG. 8

| Date | CORPSSDABLR01 | CORPSSDABLR02 | CORPSSDABLR03 | CORPSSDAUK01 | CORPSSDAUK02 | CORPSSDA02 | CORPSSDA04 | CORPSSDA05 |
|---|---|---|---|---|---|---|---|---|
| 2018-09-05 | 3100 | 2539 | 3104 | 5005 | 5205 | 3998 | 4053 | 0 |
| 2018-09-04 | 2651 | 2542 | 2701 | 4055 | 4445 | 2652 | 2865 | 1548 |
| 2018-09-03 | 1615 | 1636 | 1669 | 2377 | 2378 | 1904 | 1887 | 1093 |
| 2018-09-02 | 1513 | 1565 | 1580 | 2045 | 2122 | 3023 | 2040 | 1085 |
| 2018-09-01 | 2078 | 2133 | 2091 | 3119 | 3115 | 4542 | 3330 | 2066 |
| 2018-08-31 | 2759 | 2939 | 2860 | 5059 | 4915 | 3778 | 2874 | 2433 |
| 2018-08-30 | 2760 | 2931 | 2984 | 5311 | 5039 | 3966 | 4179 | 2541 |
| 2018-08-29 | 2795 | 2820 | 2864 | 3315 | 3115 | 3923 | 4357 | 0 |

| Date | US DA | UK DA | India DA |
|---|---|---|---|
| 2018-09-05 | 10340 | 7571 | 6378 |
| 2018-09-04 | 9343 | 6671 | 5593 |
| 2018-09-03 | 5911 | 3737 | 3603 |
| 2018-09-02 | 5610 | 3308 | 3190 |
| 2018-09-01 | 8430 | 5039 | 4574 |
| 2018-08-31 | 11125 | 7593 | 6205 |
| 2018-08-30 | 11146 | 7768 | 6289 |
| 2018-08-29 | 10667 | 5262 | 6146 |

900

VIRTUAL PRIVATE NETWORK MANAGER

BACKGROUND

Direct access technologies, including in some cases virtual private network (VPN) technologies, can provide access over the Internet to an organization or entity's intranet, including the entity's systems and resources available through an intranet. In some cases, VPN connections or other types of direct access are automatically initiated when a user connects a client computer to an Internet connection or navigates to a particular address. Typical direct access technologies do not include dedicated solutions for analyzing or reporting on user activity based on the locations of users, such as their geographic locations. For example, a user may log into an entity's network from home or another remote location, with a connection that may be routed through several locations. This can hinder user support, such as if a user experiences issues and the server or site that their machine connected to, for example to login, is not apparent.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims. In brief and at a high level, this disclosure describes, among other things, methods, systems, and computer-storage media for analyzing and reporting on user activity relating to DirectAccess and/or VPN connections based on one or more locations, for example the geographic locations of servers associated with user activity.

BRIEF DESCRIPTION OF THE DRAWINGS

Embodiments are described in detail below with reference to the attached drawing figures, wherein:

FIG. 8 is an exemplary graphical user interface displaying a server wise report regarding DirectAccess activity associated with servers in accordance with an embodiment of the present invention;

FIG. 9 is an exemplary graphical user interface showing a site wise report regarding DirectAccess activity associated with locations, for example of DirectAccess servers or activity associated with DirectAccess servers, in accordance with an embodiment of the present invention.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Although the term "step" may be used herein to connote different elements of methods employed, the terms should not be interpreted as implying any particular order among or between various steps herein disclosed unless and except when the order of individual steps is explicitly described.

Embodiments of the present invention are directed to methods, systems, and computer-storage media relating to direct access technologies. For example, DirectAccess (such as DirectAccess technology introduced by Microsoft, also known as Unified Remote Access) and VPN or similar technologies that incorporate some or all of the features of VPN are types of technology for providing access to users. In some cases, each user's machine selects a neighboring DirectAccess site associated with one on more DirectAccess servers (such as DA servers 110, 114, 118), and each user's machine connects automatically to DirectAccess and/or VPN, for example when a user is working remotely or traveling. Once a connection is established with each user's machine, a DA server (e.g., DA server 110) internally maintains or records a log relating to or including each machine. In embodiments, VPN (including VPN-like technologies) are an option within DirectAccess or a type of DirectAccess. VPN technology can automatically connect a user's machine to an entity's intranet, for example. In some cases, a VPN connection is always on when a user's machine has connected to a DirectAccess server such as DA server 110. Users' machines can be desktops, laptops, or other computing devices.

Figure 1:
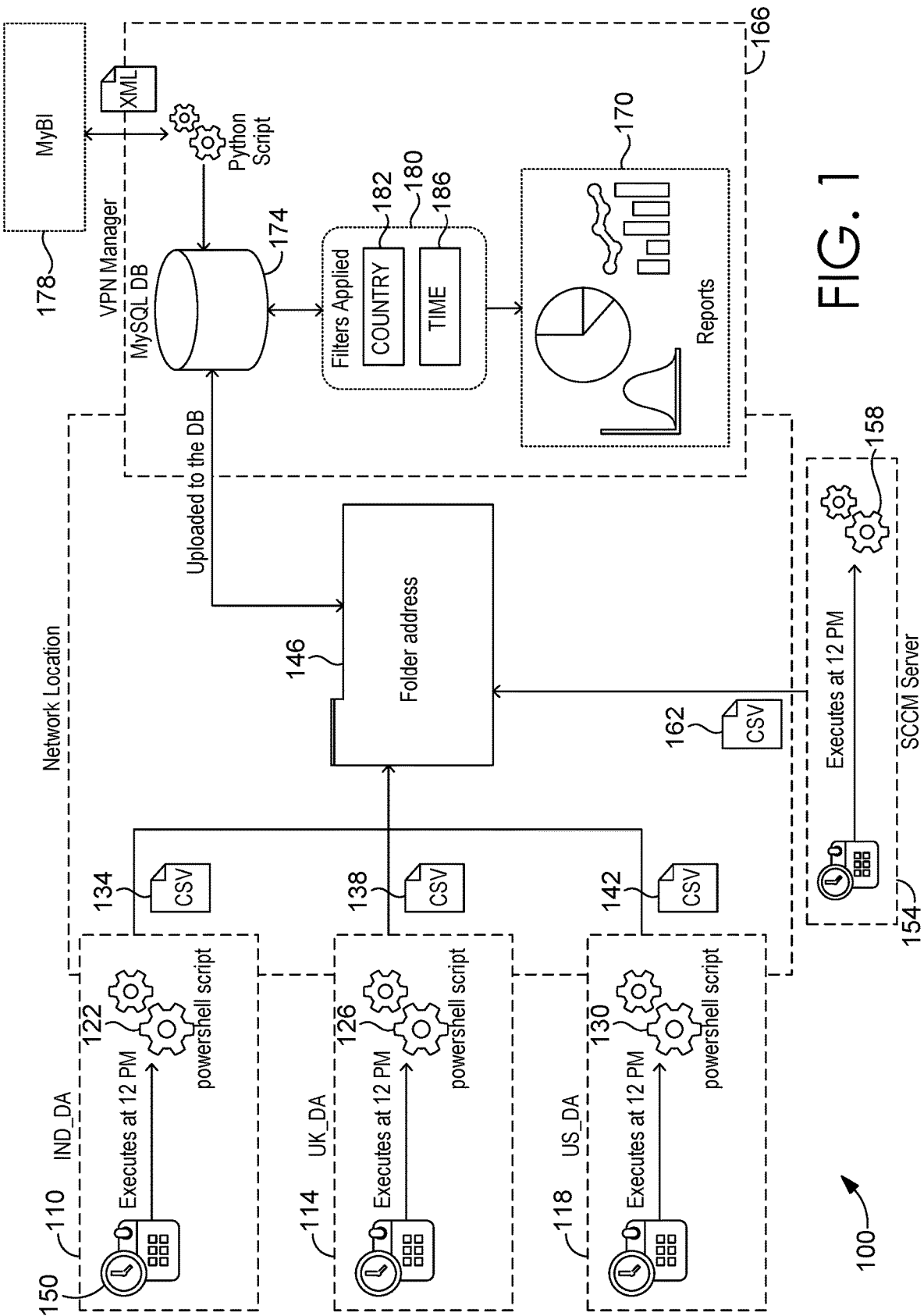
FIG. 1 is a block diagram of an exemplary computing environment suitable to implement embodiments of the present invention.

An exemplary computing environment suitable for use in implementing embodiments of the present invention is described below. FIG. 1 is an exemplary computing environment in which embodiments of the present invention may be implemented. The computing environment is illustrated and designated generally as reference numeral 100. Computing environment 100 is merely an example of one suitable computing environment and is not intended to suggest any limitation as to the scope of use or functionality of the invention. Neither should computing environment 100 be interpreted as having any dependency or requirement relating to any single component or combination of components illustrated therein.

The present invention might be operational with numerous other computing system environments or configurations. Examples of well-known computing systems, environments, and/or configurations that might be suitable for use with the present invention include personal computers, server computers, hand-held or laptop devices, multiprocessor systems, microprocessor-based systems, set top boxes, programmable consumer electronics, network PCs, minicomputers, mainframe computers, distributed computing environments that include any of the above-mentioned systems or devices, and the like. The present invention might be described in the general context of computer-executable instructions, such as program modules, being executed by a computer. Exemplary program modules comprise routines, programs, objects, components, and data structures that perform particular tasks or implement particular abstract data types. The present invention can be practiced in distributed environments where tasks are performed by remote processing devices that are linked through one or more communications networks. Program modules might be located in association with local and/or remote computer storage media (e.g., memory storage devices).

With continued reference to FIG. 1, the illustrative computing environment 100 comprises one or more computing devices in the form of servers, such as first DirectAccess (DA) server 110, second DA server 114, and third DA server 118. In embodiments, fewer or additional servers can be included, up to any number of DA servers associated with an entity, for example. In one example, DA server 110 is located in India or is associated with users located in India, and DA server 114 is located in the United Kingdom or associated with user activity in the United Kingdom. In another example, DA server 118 is in the United States or contains information regarding user activity in the United States.

In some cases, one or more of the DA servers, such as DA server 118, are located in the United States or are accessed or used by United States users. In another example, all of the DA servers, such as DA server 110, are associated with user activity in India or one or more other countries. Any combination of DA servers and locations can be used in embodiments. In some cases, all of the DA servers associated with one organization or entity can be included as DA servers, but in other cases fewer than all of the available or existing DA servers are used. For example, DA servers associated with certain types of activity can be included, such as servers that relate to activity by sales people, or remote employees or contractors, or other selected or flagged users that an entity may want to monitor or include in reports of activity.

The one or more DA servers, such as DA servers 110, 114, and 118, can each include one or more scripts. In one embodiment, each DA server utilizes a powershell script, such as powershell scripts 122, 126, and 130, as shown in FIG. 1. Each powershell script, such as powershell script 122, can be used to generate or collect logs or other information about the activity associated with a DA server, such as DA server 110. For example, powershell script 122 can be executed at a certain time or times each day. The times shown in FIG. 1 are merely examples. A script such as powershell script 122 can be executed at any time, and powershell scripts 122, 126, and 130 (and others) can be executed at the same time or different times. The times are local times relating to the locations of the DA servers 110, 114, and 118 in some embodiments, but absolute times can be used that are synchronized across one or more DA servers regardless of the local times associated with the servers. In another example, one or more powershell scripts, such as powershell script 122, can be executed at specified time(s), while other scripts associated with other DA servers must be selected or caused to be executed by an administrator or other user, when information from the other DA servers is to be included for analysis or reporting.

In embodiments of the present invention, one or more files such as powershell scripts (e.g., powershell script 122) are run on DA servers, such as DA server 110. In some cases, one script may be distributed and/or run at the same time on one or more DA servers 110, 114, 118. For example, scripts such as powershell scripts 122, 126, 130 can execute at a certain time, for example at 12:00 PM each day, and/or for five continuous minutes (or another time length), to capture live or current user activity associated with one or more DA servers, such as DA server 110. In some cases, one or more scripts such as powershell script 122 run every five minutes to provide real time or near real time data. In embodiments, data from each script execution, for example from every five minutes, is maintained to provide historical data, which can be viewed in dashboard 500 or one or more reports, discussed below. In some cases, partial data obtained from DA servers is maintained as historical data. Historical data can show detailed user activity associated with each DA server over time (e.g., DA server 110), for any time period or point. Powershell scripts such as powershell script 122 can be automated scripts that execute each day or every five minutes, for example.

As shown in FIG. 1, the execution of scripts by DA servers 110, 114, and 118 extracts information to be provided as logs, in some cases, and generates CSV files 134, 138, and 142, respectively, in embodiments of the present invention. CSV files such as CSV file 134 can be files that include "comma separated values." In some cases, CSV files 134, 138 and 142 include delimited text files that can contain numbers and text and can, in embodiments, provide log information relating to DA servers 110, 114, and 118. Other types of files or data packets can be used in embodiments to provide user-activity information associated with each DA server, such as DA server 110.

Continuing with FIG. 1, DA servers 110, 114, and 118 are in communication with folder 146, in embodiments, to provide CSV files 134, 138, and 142 to folder 146. Folder 146 collects or stores CSV files 134, 138, and 142 or the data therein, for example. Files or data can be received by folder 146 at the same time or over a span of time, and data from CSV files 134, 138, and 142 can be organized or sorted by folder 146 or grouped together based on specific criteria such as a time frame or the locations of activity associated with DA servers such as DA servers 110, 114, and 118. Folder 146 could be distributed across one or more computing devices, in some embodiments, or multiple folders such as folder 146 could be used to receive various sets of data associated with DA servers. Folder 146 can be associated with a file path or one or more file paths, for example that relate to each server such as DA servers 110, 114, and 118.

Additionally, as shown in FIG. 1, SCCM server 154 can also communicate with folder 146, in embodiments. SCCM server 154 can be, for example, a system center configuration manager (SCCM) server, for instance using software provided by Microsoft. SCCM server 154 includes fourth powershell script 158, in some cases, which can execute at a particular time (in the illustrated example, at 12:00 PM). In this example, fourth powershell script 158 can produce or cause to be generated fourth CSV file 162 associated with SCCM server 154. SCCM server 154 may include systems management software for managing, tracking, or maintaining inventory of various computing components such as servers, users and/or access by users. Fourth CSV file 162 can be used to identify or supplement data from DA servers 110, 114, and/or 118. In embodiments, information from fourth CSV file 162 is provided to folder 146, for example to identify servers, or to identify users and/or compliance (or lack of compliance) with policies associated with various servers or other components.

FIG. 1 also illustrates VPN manager 166, which can, among other things, include an interface for providing or displaying reports 170, discussed below. VPN manager 166 includes database 174 in some embodiments, which can be a MySQL database. In some cases, VPN manager 166 is used to monitor other types of access besides VPN that provide access to an intranet or other resources through the Internet, such as DirectAccess. VPN manager can be found at a link, in embodiments, for example through a secure HTTP connection.

Database 174 receives information such as logs from folder 146, which include information from DA server logs associated with DA servers 110, 114, and 118, in this example, and can also include information from SCCM server 154. In embodiments, folder 146 receives or consumes SCCM data, for example from SCCM server 154, which can identify machines, such as hostnames associated with users. This data can be used by folder 146 to prepare and provide information to database 174 or included with information provided to database 174. In embodiments, SCCM server 154 provides data that is combined with data from DA servers such as DA server 110. Database 174, although illustrated in FIG. 1 as a single, independent component, may, in fact, be a plurality of storage devices, for instance, a database cluster, portions of which may reside on various components. The information provided to, or stored or sorted by, folder 146 in FIG. 1 is inserted into database 174, in this example a MySQL database.

Application 178 in FIG. 1 is an exemplary MyBI application or website that can provide additional data to VPN manager 166. For example, application 178 can be software that provides information such as headcount data, or application 178 can be a data set of user country information. As shown, application 178 may provide data via XML to a script (such as a powershell script) included in VPN manager 166, for instance to provide headcount data to database 174.

Illustrative VPN manager 166 in FIG. 1 applies filters 180 to information from database 174, for example country filter 182 and/or time filter 186. One or more filters 180 can be used in various embodiments, for example based on whether user activity from all countries associated with DA servers 110, 114, 118 should be included in reports, or whether user activity from certain dates or time frames will be included in reports, such as report 170. Other filters 180 may be based on employee type, user-account type, specific user activities (such as accessing of sensitive information or use of certain programs or data sets by users), unusual or flagged user activities, or other criteria. VPN manager 166 provides one or more reports 170 in embodiments of the present invention, which can be viewed or exported using VPN manager 166 as described in more detail below, including with respect to FIGS. 8 through 10.

VPN manager 166 can use, for example, a LAMP stack, which may refer to Linux, Apache, MySQL, and/or PHP. In some cases, Linux is the operating system used to record application data, for example data associated with VPN manager 166. Apache technology can be used for server technology. MySQL can be used for database 174, which can be a MySQL database. In some cases, PHP can provide user interface and/or business logic that is used to implement embodiments of the present invention. Other systems, programs, or software tools, including open source technologies, can be used to implement embodiments of the present invention.

VPN manager 166 can monitor and/or report on VPN connections including VPN-like technologies, along with DirectAccess connections, in embodiments. DirectAccess technology can allow for VPN or VPN-like technologies, in some cases including a secure, encrypted VPN or VPN-like technology. An entity may have unique users of DirectAccess and/or VPN technologies, and embodiments of the present invention allow an entity to analyze and receive reports regarding both types of connections, in some cases. In embodiments, VPN manager 166 is integrated with LDAP (Lightweight Directory Access Protocol), discussed below with respect to FIG. 7, and authentication or aspects of authentication occur on a remote server in a secure location, making it possible only for an associate from the organization to access the data. LDAP can contain SLDAP, which is an intermediator between the application and the remote directory, which can facilitate the validation of information.

Embodiments of the present invention enable executives or other leaders of an entity, or administrators or associates, to know the amount of users utilizing DirectAccess (in one example, the amount of users associated with one or more DA servers, such as DA servers 110, 114), in some cases based on the users' locations, such as their geographical locations. For example, administrators can select a granular-level view of how DirectAccess is used at different locations, for example how users are accessing DirectAccess sites and associated DA servers (e.g., DA server 110). In embodiments, users' locations may be viewed or displayed based on the type of location they are associated with (e.g., corporate locations versus sales locations). As described above, one or more "live" or current associate or user counts can be determined for some or all locations. Administrators or leaders of an entity, for example, can determine the impact of potential migrations or changes involving DirectAccess or other technologies using embodiments of the present invention, in order to proactively plan migrations or alternate solutions. Administrators can also determine and monitor detailed user sessions, in some cases. In some cases, an entity can update or change the DA server, such as DA server 110, associated with one or more users, in order to address issues with connectivity or performance, after receiving information indicating which DA server a user login is associated with, even if a user's connection is routed through one or more locations, as discussed below.

Exemplary components of embodiments of the present invention include servers that can comprise a processing unit, internal system memory, and a suitable system bus for coupling with various other system components. Servers such as DA server 110 can include therein, or have access to, a variety of computer-readable media. Computer-readable media may be any available media that can be accessed by DA server 110 or another component, and includes volatile and nonvolatile media, as well as removable and nonremovable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, including communication media, which can be used to store the desired information.

In embodiments, servers such as DA server 110 and other components operate in computing environment 100 using logical connections to one or more remote computers or other devices. Remote computers might be located at a variety of locations. Computing environment 100 is merely an example of one suitable computing system environment and is not intended to suggest any limitation as to the scope of use or functionality of embodiments of the present invention. Nor should computing environment 100 be interpreted as having any dependency or requirement related to any single module/component or combination of modules/components illustrated therein. Other components are not shown but such components and their interconnection are well known.

In some cases, users such as employees of an entity may report issues with their machines' performances including on an entity's network or relating to a DirectAccess or VPN session. For example, a user may be routed through more than one connection between a hub and the user (in some case thousands), and an administrator or other associate needs to determine the DA server (e.g., DA server 110) that the user connected to initially or at login. VPN manager 166, in embodiments, applies one or more filters to determine the locations where users actually logged in (including if a user should not have logged in in association with a particular location). In an example, a user may log in from one country such as the United Kingdom but their connection may be routed through or appear to be associated with a DA server in India, such as DA server 110. Embodiments of the present invention allow an administrator to determine the first or original DA server that the user's activity is associated with, in this example in the United Kingdom, instead of locations that a user is merely routed through. This can aid in addressing user issues regarding performance, speed, access, or other problems, because an administrator can analyze which DA server or site is associated with the user's login (as opposed to a server or component used for routing only). An entity can use this information to decide to cause one or more users to utilize a different DA server or hub, for example to address performance or bandwidth issues.

In another example, an entity's office in a location may be closed, but users associated with that office may still log in and access an entity's production systems or other resources. Embodiments of the present invention allow administrators or leaders of an entity, for example, to determine and receive reports on how many users associated with that office connected and/or worked during the time frame when the office was closed, for example from an off-premises location. In some cases, administrators or other associates can monitor bandwidth associated with various locations, including in real time based on current user activity. If certain sites are over- or under-utilized, an entity can determine a balance or redistribution of user activity with respect to DirectAccess technologies in different locations. An entity may need to (or desire to) increase DirectAccess resources or availability in certain locations (or in new locations with proximity to user activity) based on reports generated by embodiments of the present invention (e.g., report 170).

Figure 2:
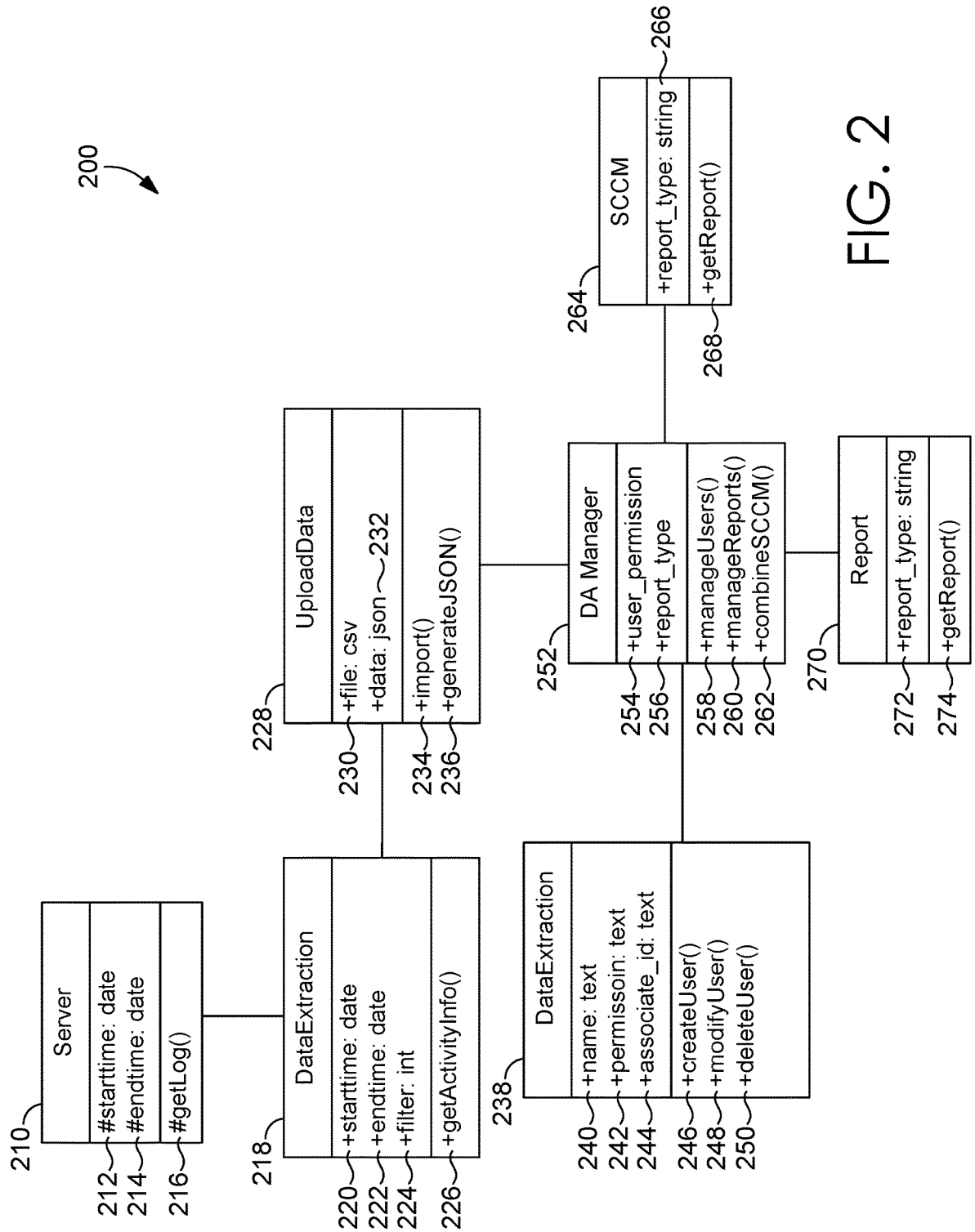
FIG. 2 is a class diagram of exemplary classes suitable to implement embodiments of the present invention.

Turning to FIG. 2, an exemplary class diagram 200 is shown including relationships between aspects of class diagram 200. Class diagram 200 is just one example of possible classes, operations, and relationships in accordance with embodiments of the present invention. As shown in FIG. 2, server class 210 includes first attribute 212, which can be a start time and date, and second attribute 214, which can be an end time and date, and one or more operations such as operation 216, in this case an operation or administrative command to get logs associated with server class 210. Server class 210, in embodiments, can include one or more attributes such as the examples in attributes 212, 214, and one or more operations such as operation 216. The various attributes and operations shown in class diagram 200 are examples and are not intended to limit the scope of embodiments of the present invention.

As shown in FIG. 2, class diagram 200 includes first data extraction class 218, with, in this example, start time attribute 220, end time attribute 222, and filter attribute 224, along with operation 226, which in this case is an operation to get logs, or to retrieve activity information, for example user activity associated with a server. In embodiments, server 210 could represent DA server 110 or DA server 114, for example. Continuing with FIG. 2, class diagram 200 includes upload data 228, which is shown with attributes 230 and 232, which in this example are CSV file (attribute 230) and json data (attribute 232), along with operations 234 and 236, regarding importing data and generating data in a format such as json, respectively. In some cases, operations 234 and 236 could be used to import CSV files such as CSV file 134 in FIG. 1 and to generate json data, which may be in text format.

FIG. 2 also includes second data extraction class 238, with attributes associated with name (attribute 240), permission (attribute 242), and associate identifications (attribute 244), for example, and operations relating to creating, modifying, or deleting users (operations 246, 248, and 250, respectively). As stated, various attributes and operations may be associated with classes represented in FIG. 2 besides the examples shown, and second data extraction class 238 can include some or all of the attributes and operations shown or additional attributes and operations in embodiments of the present invention.

Turning to DA manager class 252, attributes relating to user permissions and report types (attributes 254 and 256, respectively) are included, along with operations relating to managing users (operation 258), managing reports (operation 260), and combining or compiling data associated with an SCCM (operation 262) such as SCCM 154 in FIG. 1. SCCM class 264 is shown in relation to DA manager class 252, and SCCM class 264 includes a report type attribute 266 and operation 268 for obtaining reports associated with SCCM class 264. Report class 270 in FIG. 2 is also shown with a report type attribute, in this case report type attribute 272, and an operation 274 for getting reports. The examples of operations shown in FIG. 2 can be administrative commands or functions that can be called or utilized, in embodiments.

Figure 3:
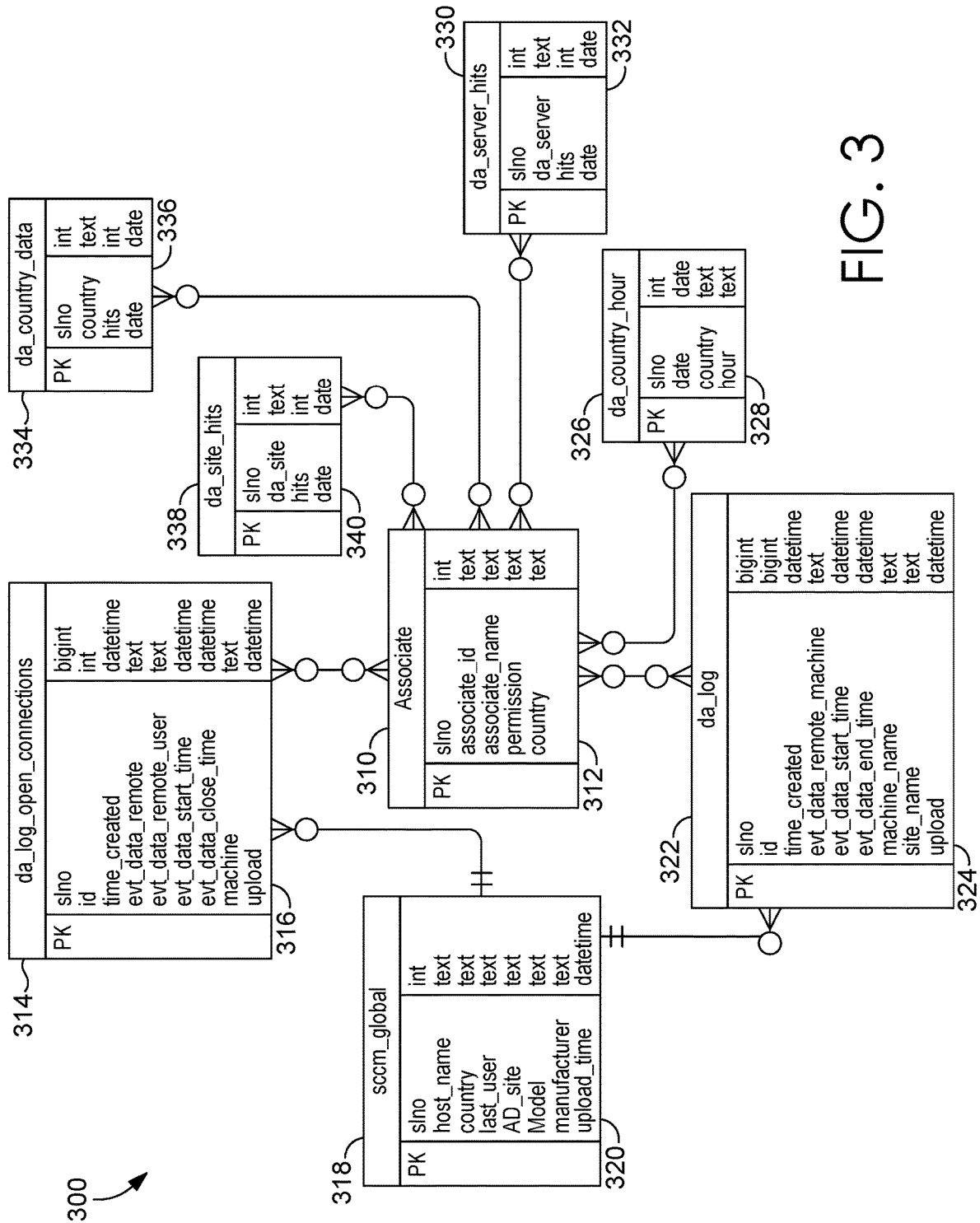
FIG. 3 is a database diagram relating to exemplary database relationships and fields in accordance with an embodiment of the present invention.

FIG. 3 shows database diagram 300, including various connections between databases or tables in one embodiment of the present invention. The databases or tables and connections included in database diagram 300 are for illustration purposes, and various databases and primary keys, for example, can be used in other embodiments. Additionally, intermediate tables can exist that are not shown in exemplary database diagram 300 in FIG. 3. In embodiments, databases as represented in database diagram 300 are maintained by or associated with one or more components, for example DA servers 110, 114, 118 as shown in computing environment 100, or with certain users or employees, for example associates and in some cases associates who may have access to VPN manager 166 and/or an ability to request reports such as report 170.

Associate database 310 is shown in FIG. 3, including various primary keys or fields 312, for example associate identifications, names, permissions, and countries for associates in associate database 310, which can be maintained as text. In some cases, an "slno" field (e.g., as shown in fields 312) can be used to indicate integer values for database entries and/or to add auto-increments in a database, such as increments of integer values. DA log open connections database 314 is shown in FIG. 3, along with primary keys or fields 316, which can include text fields indicating machines, and date and time fields indicating start and close times and upload times, for example. DA log open connections database 314 relates to both associate database 310 and SCCM global database 318, as illustrated in the example in FIG. 3. SCCM global database 318 includes fields 320 associated with a host name, country, last user, model, and manufacturer, for example. Other fields for each database in FIG. 3 can be included (or omitted), for example a date and time field for upload data as shown in fields 320 associated with SCCM global database 318.

DA log database 322 in FIG. 3 illustrates one or more fields 324 associated with DA log database 322, such as a time created, data relating to one or more remote machines, and machine names, among other fields as shown in FIG. 3. DA country hour database 326 illustrates fields 328 relating to dates, countries, and hours, for example. DA server hits database 330, in this case, is shown with fields 332, for example indicating DA servers, hits, and dates. DA country data database 334 can store information relating to, for example, fields 336 indicating countries, hits, and dates. DA site hits database 338 in FIG. 3 shows fields 340, for example DA sites, hits, and dates.

FIG. 3 illustrates possible relationships between databases, including that relationships can be considered both optional and/or "one to many," in some cases. For example, each relationship in FIG. 3 between databases can be optional, and each three-prong connection (or "claw" connection) can indicate a "one to many" or a "many to many" relationship (depending on whether the "claw" connection appears at one end or both ends of a connection, respectively). For example each associate 310 can relate to many DA site hits, such as DA site hits 338, and to many DA logs, such as DA log 322. On the other hand, in this example, one SCCM global database 318 can relate to many DA log open databases (e.g., DA log open database 314) and to many DA log databases (e.g., DA log database 322), as shown by the connections in the example in FIG. 3, but, in this example, DA log database 322 would not relate to many SCCM global databases. Instead DA log database 322 and DA log open connections database 314, in the example in FIG. 3, each relate to only one SCCM global database 318, as indicated by single line connections at SCCM global database 318 in FIG. 3.

Figure 4:
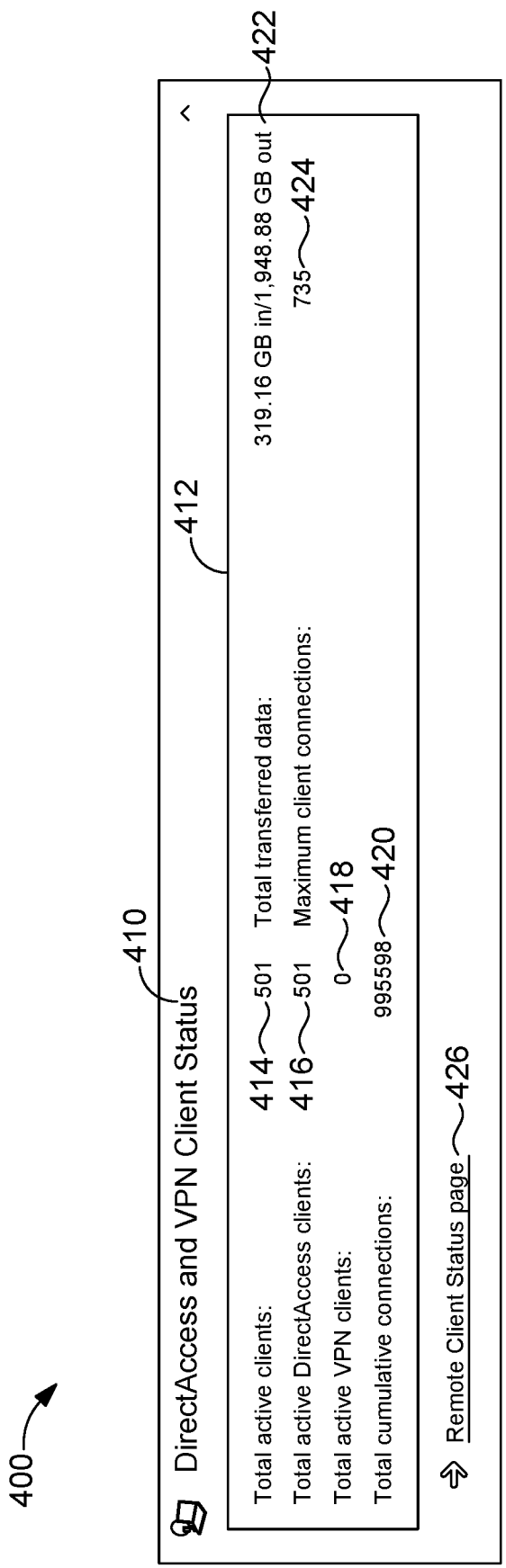
FIG. 4 is an illustrative representation of a report including status information without representations of locations associated with user activity.

FIG. 4 shows representation 400 of the type of prior report 412 generated for DirectAccess and/or VPN clients without location information available for display, for example. In some cases, DirectAccess software available from Microsoft can be used to provide prior report 412, without location information relating to servers or user activity. As indicated by report heading 410, prior report 412 in FIG. 4 relates to DirectAccess and VPN client status information. Prior report 412 does not display information regarding DirectAccess servers or their locations, or user activity associated with the servers. Prior report 412 includes total active clients 414, total active DirectAccess clients 416, and total active VPN clients, for example, and total cumulative connections 420. The total numbers cannot be viewed on a more granular level in prior report 412. As shown in FIG. 4, prior report 412 may also show total transferred data 422 or maximum client connections 424, and it can include a link 426 to another status page, such as a remote client status page.

Figure 5:
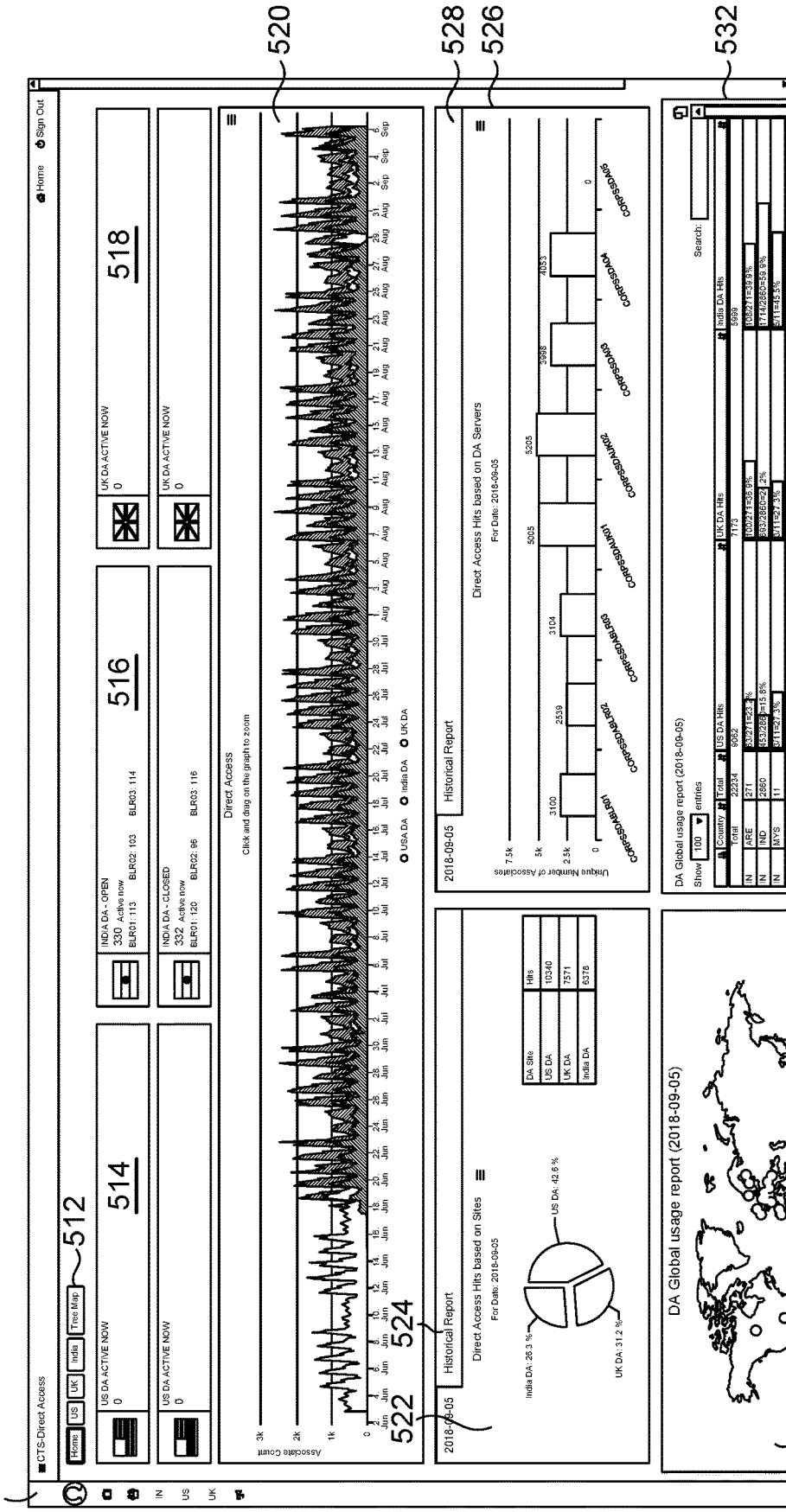
FIG. 5 is an exemplary graphical user interface showing a dashboard with information relating to DirectAccess activity in accordance with an embodiment of the present invention.

As shown in FIG. 5, a graphical user interface can include dashboard 500 that displays information to an administrator or other user. Dashboard 500 and reports, as discussed below, can be displayed via a graphical user interface that allows navigation by a user including to one or more reports. Displays in accordance with embodiments of the present invention can include options to view in-depth location-based reporting and analysis, for example how many users are connected to each DirectAccess site or server. Dashboard 500 in FIG. 5, and in some cases one or more reports as described below, can replace manual processes for attempting to generate reports and can include "live" reporting of current information, allowing administrators or others to easily monitor user activity relating to any DirectAccess server at any point in time, to obtain a clear picture of user activity (total and at a granular level, for example) across all of an entity's server locations.

Dashboard 500 can be shown on a display that is part of, or associated with, VPN manager 166 in FIG. 1, for example, or on another device. Panel 510 in dashboard 500 includes links to particular geographic locations or countries, in some cases, and a representation of a logged-in associate. Panel 510 can contain quick links to certain information that the logged-in associate is likely to access, has accessed in the past, or that other associates have used. An associate may drag or select certain icons to panel 510 to act as links for easy access to certain data or functions while using dashboard 500. User options 512 in FIG. 5 can show views that may be selected or toggled between when using dashboard 500, in embodiments. In the example in FIG. 5, the "Home" portion of user options 512 is selected, and a user may be able to determine which view from among user options 512 is currently presented by a visual indication, such as bolding, highlighting, size changes, or color-coding.

User options 512 allow users to toggle views, for example, between "Home," "US," and "UK," in some cases, which can navigate a user from a global "Home" dashboard 500 view to a view of narrower data relating to activity in the United States or United Kingdom. Other options may include other countries, continents, states, or regions, for example, or a "Tree Map" option, discussed further below. Box 514 in FIG. 5 displays the currently active DA users in the United States, in an embodiment. Box 516 indicates active users in India, for example, including a breakdown of activity by server in some cases. Box 518 shows no active users associated with DA servers in the United Kingdom, in this example.

Graph 520 can be a line graph or other format of graphical representation relating to DirectAccess activity associated with the United States, India, and the United Kingdom, for example. Other countries, or broader or narrower geographic areas, can be displayed or provided as display options to a user on dashboard 500. The line graphs corresponding to activity in different locations, such as countries, can be color-coded for easier viewing. For example, DirectAccess activity associated with the United States can be shown in green, while blue can be used for activity associated with India and yellow for activity associated with the United Kingdom. Therefore, one graph such as graph 520 can present data for three (or more) different locations. As shown in FIG. 5, a user can click and/or drag graphs 520 to view a larger version of graph 520, in some cases on its own, entire screen, for example.

FIG. 5 shows an exemplary site report 522, which can be dated. Site report 522 as part of dashboard 500 displays DirectAccess hits, or activity, by country or server location. Therefore, site report 522 can be referred to as a report of DirectAccess hits based on sites, such as DA servers (e.g., DA servers 110, 114, 118), in some cases. In this example, a recent report such as site report 522 is presented to a user, and historical site report 524 is available for selection or toggling, for example to compare current DirectAccess hits to historical hit data. Dashboard 500 can also display server report 526, indicating DirectAccess hits based on servers, such as DA server 110 in FIG. 1. As shown in FIG. 5, server report 426 can present current counts of the unique number of associates (or approved users, such as employees) per server, or the counts for a particular date. Dashboard 500, in embodiments, includes an option to select historical server report 528, for example for earlier dates.

FIG. 5 includes usage report 530. Usage reports such as usage report 530 are discussed in more detail with respect to FIG. 7, below. Usage report table 532 in FIG. 5 can correspond to usage report 530. In some cases, both usage report 530 and usage report table 532 contain global information relating to an entity, which can be displayed broken down by locations based on user selections within usage report 530 or columns in usage report table 532. The exemplary dashboard 500 in FIG. 5 is one screenshot or view of a dashboard. Embodiments of the present invention include displays of one or more of the aspects illustrated in dashboard 500.

Figure 6:
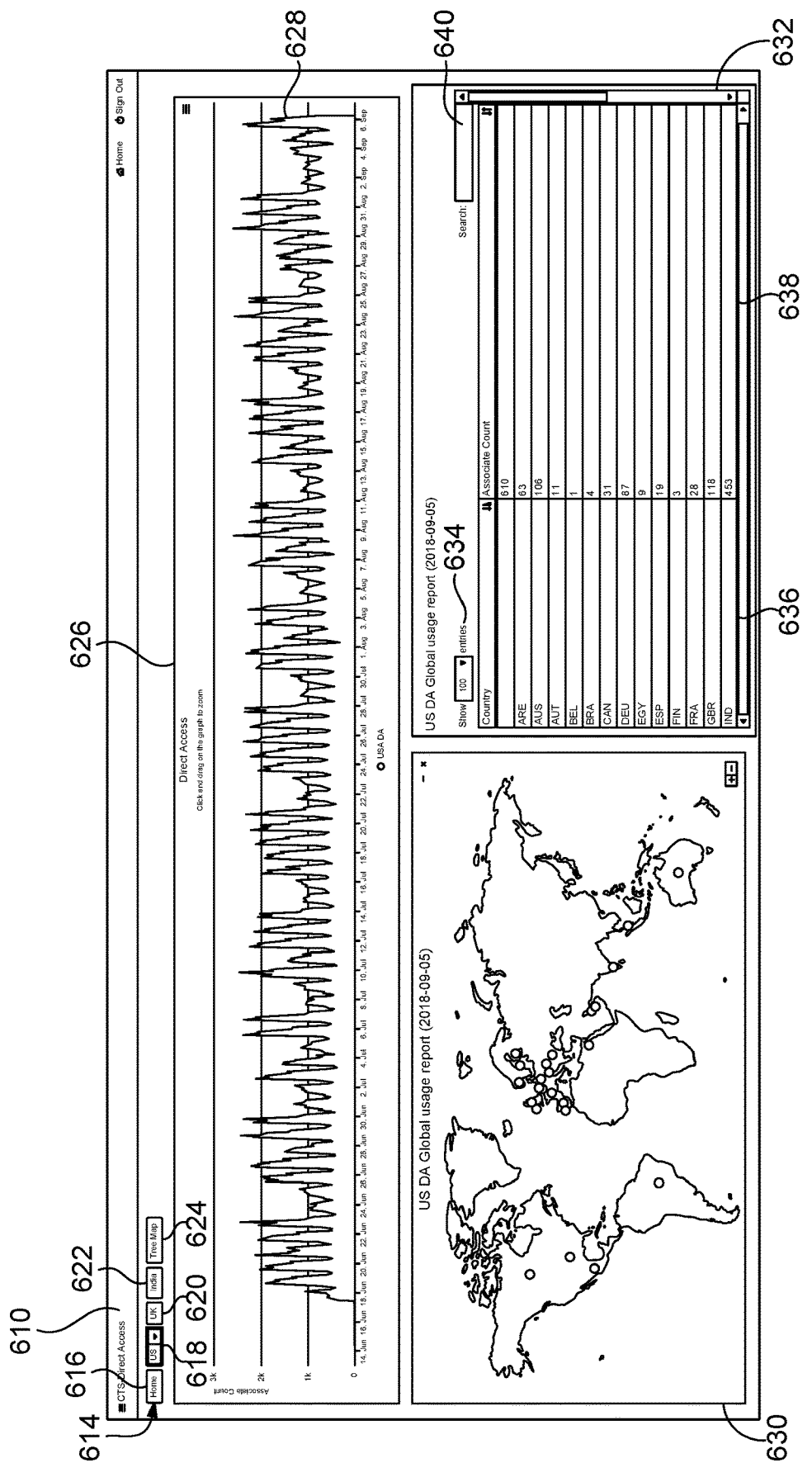
FIG. 6 is an exemplary graphical user interface displaying a site report regarding DirectAccess activity in accordance with an embodiment of the present invention.

FIG. 6 is one example of a DA site report, in this case DA site report 600, which can be displayed on an interface as part of, or in association with, VPN manager 166. Bar 610 displays information about the report, for example "Direct Access" as shown in FIG. 6. User options 614 are shown underneath bar 610, in this example, but user options 614, if they are provided, can be displayed anywhere on an interface while a user views DA site report 600, for example. User options 614 include a home button 616, which can navigate a user to a home view that is not limited to the United States or any other country, in embodiments.

US button 618 is shown as selected in FIG. 6, for example by being clicked on or otherwise selected by a user. Selection of US button 618 can cause DA site report 600 to display information about DirectAccess activity in the United States only. US button 618 can include a drop-down menu option as shown in FIG. 6, which could provide options for narrowing the United States data to a subset, for example by geographic range or sites in the United States. UK button 620 can be selected, in embodiments, to cause the display of DirectAccess activity or sites in the United Kingdom. India button 622 is selected by an associate or other user, such as a company leader, in embodiments, in order to display DirectAccess activity in India relating to one or more DA servers (such as DA server 100 in FIG. 1). Additional or fewer buttons for various geographic areas can be displayed for selection by an associate, for example.

In the embodiment in FIG. 6, tree map button 624 can be selected, which displays a global or regional map corresponding to DirectAccess data. In some cases, a tree map displayed is a graphical representation of the components of DirectAccess activity or users, such as a rectangular area divided into smaller rectangles or other portions corresponding to various locations with DirectAccess activity. In one example, a rectangle representing all DirectAccess use associated with an entity is divided into smaller, color-coded rectangles corresponding proportionally to each country or DirectAccess site.

Graph 626 in FIG. 6 can display use of DirectAccess over time, for example by day as shown. In some cases, the DirectAccess use in graph 626 is for a company as a whole, but it can be use associated with one site, one country, or even one or more individual users. Line 628 in FIG. 6, in one embodiment, indicates the total associate counts associated with DirectAccess use in the United States. If home button 616 is selected, graph 626 can display DirectAccess use globally, for example, and if UK button 620 is selected, graph 626 can display activity over time in the United Kingdom. Global usage report 630, as shown in the exemplary display of DA site report 600 in FIG. 6, can show a map of DirectAccess sites that can be selected or expanded, as discussed below with respect to FIG. 7. Global usage report 630 can be minimized or closed by a user viewing DA site report 600.

Global usage report table 632 provides details regarding global usage as shown in FIG. 6. For example, for entries selected 634 (in this case 100 entries), a column of countries 636 (or other location descriptions such as cities or continents) is displayed, and a column of associate counts 638 is also displayed, showing the associate counts for each location entry. In some cases, search box 640 is provided as part of DA site report 600, for example to allow a user to search for a particular country code or other location. Usage reports and tables can indicate the date that the data was collected or verified, in some cases.

Figure 7:
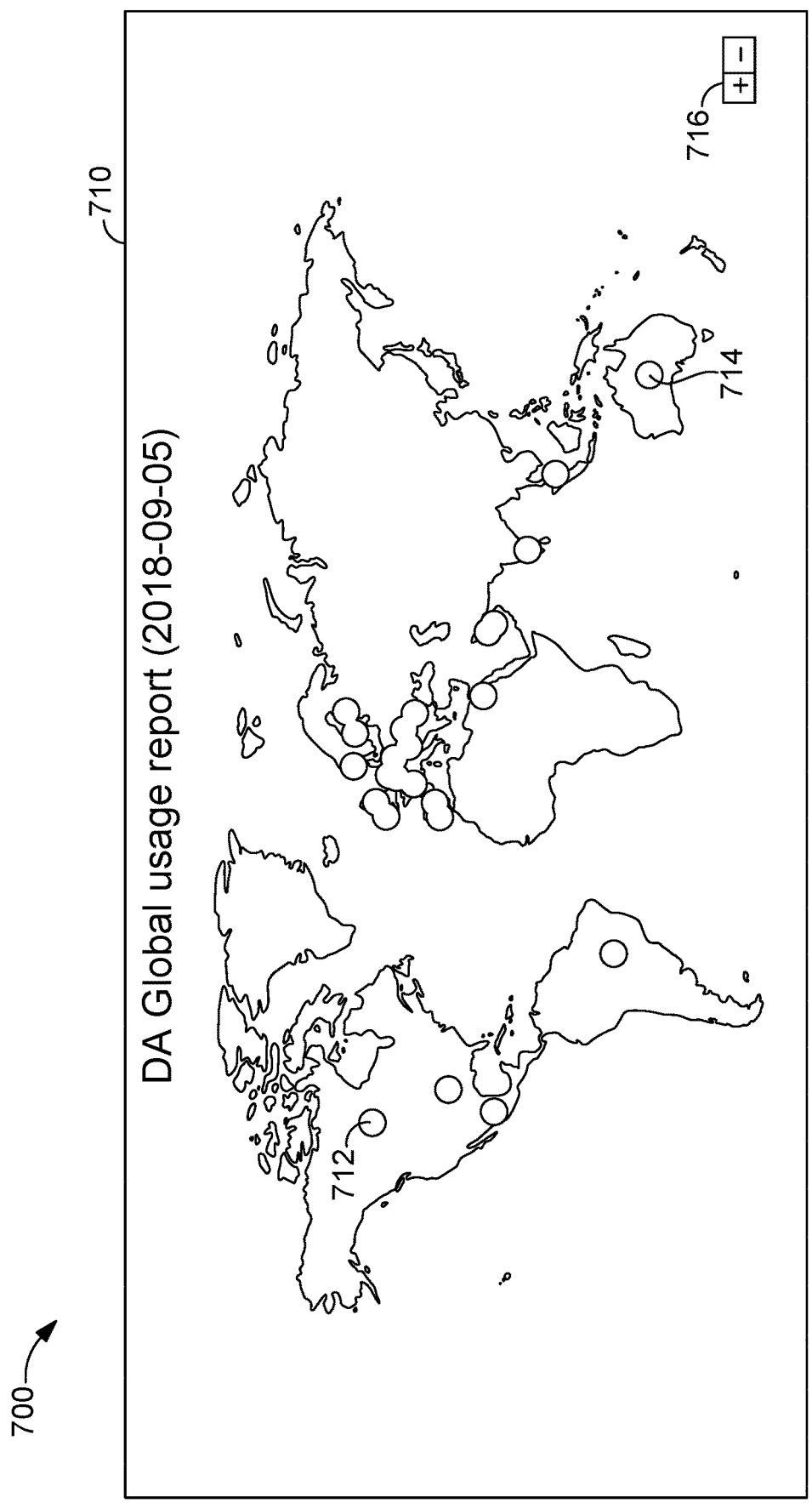
FIG. 7 is an exemplary graphical user interfaces presenting a usage report, for example a DirectAccess global usage report, in accordance with an embodiment of the present invention.

FIG. 7 illustrates one embodiment of interface 700 displayed to an administrator or other user, such as one or more leaders or executives of an entity. In FIG. 7, interface 700 presents usage report 710, which can be a global usage report. As shown, first location 712 in FIG. 7 is in Canada, for example, and second location 714 is in Australia. Zoom buttons 716 are also displayed as part of interface 700 in embodiments, allowing associates to zoom in on specific regions or locations or zoom out to view a larger area. Various locations shown on in FIG. 7 can be selected by being clicked on, or hovered over, in order to display more information about the locations, such as first location 712. An associate can also select or hover over a location, such as first location 712, to see options for displaying or filtering data associated with that location, in embodiments.

In some cases, first and second locations 712, 714 are displayed with indications they can be selected because they are locations associated with reports or the ability to generate reports, such as report 170 in FIG. 1. In some cases, a logged in associate can toggle the view shown by interface 700 in order to view more or less locations, such as first location 712, or locations could be selected in order to be added (if available) or removed, for example by clicking on one or more locations. A date can be displayed on interface 700, which can be the date a report is generated or a date associated with available user activity (or the last date of logged user activity).

Turning to FIG. 8, an example of a server wise report 800 is shown. Server wise report 800, as with other reports, can be viewed on or exported by one or more components associated with VPN manager 166 in FIG. 1, for example. Server wise report 800 can include date column 810 with one or more dates in date column 810. In some cases, times or other markers can be used instead of dates. First date 812 in FIG. 8, in this example, corresponds to Sep. 5, 2018. Second date 814, in this example, represents Sep. 4, 2018.

The dates in first date 812 and second date 814 can be dates where server data was collected or dates where user activity was recorded and then collected for analysis (for example by folder 146 and/or VPN manager 166 in FIG. 1).

First server column 816 in FIG. 8 represents data associated with a first server. In this example, on first date 812, first server user count 818 is a value of "3100." This could indicate that 3,100 user accounts or logins (or other tracking of activity) occurred at a first server (e.g., DA server 110) on first date 812. Second server column 820 also shows activity or counts on one or more dates (e.g., first date 812 and second date 814), but for a second server. The first and second servers could be in the same country or different countries, depending on whether a user is viewing a server wise report 800 for global usage or for the United States, for example. Any number of servers or time points can be included in server wise report 800, and servers can be identified by aliases or location data, in embodiments.

FIG. 9 shows an exemplary site wise report 900, which includes date column 910 in embodiments, with first date 912 and second date 914. Any number of dates can be included in site wise report 900. US DA column 916 in FIG. 9 correlates to DirectAccess user activity or logins in the United States associated with a particular entity, for example, which can include activity or logins associated with one or more DA servers in the United States (such as DA server 118 in FIG. 1). As shown in the illustrative site wise report 900 in FIG. 9, first date 912 is associated with first count 918 of "10340" for United States DA servers. Each date or time point in date column 910 is maintained in association with a specific count for each region or country's DA servers, in embodiments. UK DA column 920 displays count or user activity data for each date or time point, as well, in embodiments, in this case for users associated with DA server(s) in the United Kingdom (such as DA server 114 in FIG. 1).

Figure 10:
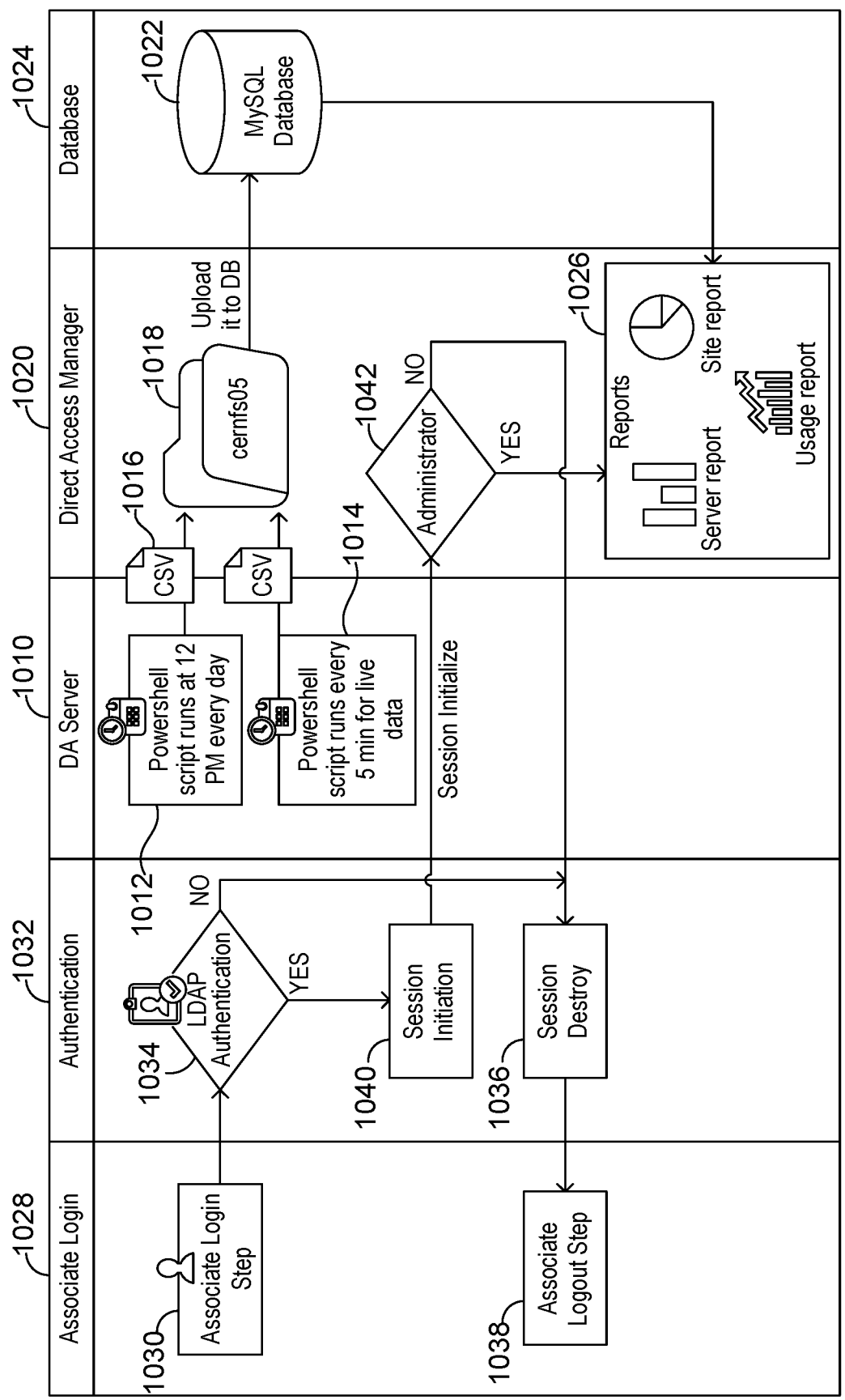
FIG. 10 is a flow diagram regarding an associate login flow in accordance with an embodiment of the present invention.

FIG. 10 is an illustrative flow diagram 1000 of a login process, for example an associate login process. In embodiments, an associate login process relates to an associate accessing VPN manager 166, for example, or other manager in order to receive one or more reports on user activity. As shown at DA server 1010, one or more powershell scripts 1012, 1014 run. Aspects of the login process in flow diagram 1000 associated with DA server 1010 can be executed by DA server 110 in FIG. 1, for example, or DA servers 114 and 118. In this case, first powershell script 1012 is executed once a day at a specific time, for example 12:00 PM. Second powershell script 1014 runs every five minutes, in this embodiment. Different time increments can be used in embodiments. Powershell scripts 1012, 1014 generate or upload CSV files, as shown at 1016, for example, to folder 1018 at Direct Access manager 1020. In FIG. 10, information from folder 1018 is uploaded to MySQL database 1022, as shown at database 1024. MySQL database 1022 can provide reports 1026 or information for reports 1026 at Direct Access manager 1020.

An exemplary associate login process can begin with associate login step 1030, as shown at associate login 1028. As shown at LDAP authentication 1034, an associate can be authenticated or not. If not, the next step is session destroy 1036, as shown in FIG. 10, followed by associate logout step 1038. In other cases, if authentication is successful, for example, following LDAP authentication 1034 can be session initiation 1040. In embodiments, other forms of authentication may be used or a prior authentication of the associate or associated with a session can be used. At 1042, administrator or another access control technology, in some cases as part of Direct Access manager 1020, can determine "No" and cause session destroy 1036 and/or associate logout 1038. If, at 1042, administrator or another access control technology determines "Yes," an associate can view or download reports 1026, as shown in FIG. 10. Direct Access manager 1020, in embodiments, can relate to managing other virtual networks or remote-access technologies for an entity without departing from the scope of embodiments of the present invention. In some cases, one or more steps performed at Direct Access manager 1020 can be performed by a VPN manager, such as VPN manager 166 in FIG. 1.

The present invention has been described in relation to particular embodiments, which are intended in all respects to be illustrative rather than restrictive. Further, the present invention is not limited to these embodiments, but variations and modifications may be made without departing from the scope of the present invention.

What is claimed is:

1. A computer-implemented method of analyzing user activity, the method comprising:
 receiving a first log of direct access data from a first Virtual Private Network (VPN)-type server, wherein the first VPN-type server is associated with a first location;
 receiving a second log of direct access data from a second VPN-type server, wherein the second VPN-type server is associated with a second location that is different from the first location;
 receiving a third set of data from a system center configuration manager server that identifies servers, users, and compliance with server policies;
 aggregating the first, second, and third sets of data into a folder stored in a database;
 monitoring, by a manager tool utilizing the data aggregated in the folder, connections of the first and second VPN-type servers;
 generating and causing display of a graphical user interface (GUI) having a report based on the monitoring by the manager tool, wherein the report includes:
  a map having a first representation of the first location, an indication of connections of the first VPN-type server, a second representation of the second location, and an indication of connections of the second VPN-type server;
  an option to view a first set of historical users associated with the first location in response to a hovering action associated with the first representation of the first location; and
  a graph representing a set of global users by region; and
 providing connection information that indicates a first connection associated with one or more users from the first set of users was routed through a third location.

2. The computer-implemented method of claim 1, wherein the first log of direct access data includes login information.

3. The computer-implemented method of claim 2, wherein the login information indicates that the first set of users logged into the first server.

4. The computer-implemented method of claim 1, wherein the map is a global map and the report indicates the first set of users associated with the first location by displaying a total quantity of users associated with the first location.

5. The computer-implemented method of claim 4, wherein displaying a total quantity of users associated with the first location includes displaying a total number of active users that initially logged into the first server.

6. One or more computer-readable storage media storing computer instructions thereon for execution by one or more processors to perform a method, the media comprising:

receiving a first set of direct access connection data for a first Virtual Private Network (VPN)-type server associated with a first geographic location and a second set of direct access connection data for a second VPN-type server associated with a second geographical location that is different from the first location, wherein the first set and the second set are generated from an automated script run at the first and second VPN-type servers, respectively;

receiving a third set of data that identifies servers, users, and compliance with server policies, wherein the third set is generated from another automated script run at a system center configuration manager server;

aggregating data of the first, second, and third sets of data into a folder stored in a database;

monitoring, by a manager, usage of the first and second VPN-type servers based on the data aggregated in the folder;

generating a first report based on monitoring the connections;

generating and causing display of a graphical user interface (GUI) that displays the first report, wherein the GUI includes a visual representation of the first geographic location, a visual representation of the second geographic location, and a first quantity of active direct access technology users for the first geographic location, wherein the first geographic location is selectable within the first report of the GUI to cause display of a first graph of the usage of the first VPN-type server, and wherein the second geographic location is selectable within the first report of the GUI to cause display of a second graph of the usage of the second VPN-type server;

allowing a download of the first report by a first user based on an Lightweight Directory Access Protocol (LDAP) authentication of the first user; and updating the first server, based on one of the first quantity of active direct access technology users for the first geographic location.

7. The media of claim 6, further comprising:
receiving a selection of the first geographic location; and
providing a second report for the GUI, based on the first set of server log data, in response to the selection.

8. The media of claim 6, wherein the first set of direct access connection data includes data indicating a first set of user logins associated with the first server.

9. The media of claim 6, further comprising receiving a first set of headcount data.

10. The media of claim 7, wherein the display includes a second number of active direct access technology users for the second geographic location.

11. The media of claim 6, wherein the display includes a map enabling the first user to zoom in on a region.

* * * * *